(12) United States Patent
Anantha

(10) Patent No.: US 7,603,130 B2
(45) Date of Patent: Oct. 13, 2009

(54) LOCATING AND DISPLAYING INFORMATION ABOUT USERS OF PROXIMATELY LOCATED WIRELESS COMPUTING DEVICES

(75) Inventor: Anoop Anantha, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 11/370,755

(22) Filed: Mar. 8, 2006

(65) Prior Publication Data

US 2007/0211673 A1    Sep. 13, 2007

(51) Int. Cl.
    *H04W 24/00* (2006.01)
(52) U.S. Cl. ............... 455/456.3; 455/456.1; 455/404.1
(58) Field of Classification Search ................. 370/310, 370/328, 329, 338; 455/414.3, 404.2, 456.1, 455/456.3, 457, 414.1; 709/223, 220, 204; 380/258; 725/10, 12
    See application file for complete search history.

(56) References Cited

U.S. PATENT DOCUMENTS

2003/0104820 A1*  6/2003  Greene et al. ............... 455/456
2005/0085239 A1*  4/2005  Cedervall ................. 455/456.1
2006/0078122 A1*  4/2006  Dacosta ....................... 380/258
2006/0135177 A1*  6/2006  Winterbottom et al. .. 455/456.1
2007/0030824 A1*  2/2007  Ribaudo et al. ............. 370/328
2007/0113241 A1*  5/2007  Mai et al. ...................... 725/10
2007/0150444 A1*  6/2007  Chesnais et al. ............... 707/3
2007/0156656 A1*  7/2007  Pather et al. ................... 707/3
2008/0057924 A1*  3/2008  Stewart ................... 455/414.3
2008/0201425 A1*  8/2008  Baker ......................... 709/204

* cited by examiner

*Primary Examiner*—Jean A Gelin
(74) *Attorney, Agent, or Firm*—Hope Baldauff Hartman, LLC

(57) ABSTRACT

A wireless communications signal is sampled to obtain one or more data packets. Identifying data is then retrieved from the wireless data packets that uniquely identifies a proximately located computing device that transmitted one or more of the data packets. A server computer is then queried with the identifying data to obtain additional information regarding the proximately located computing device. The additional information regarding the proximately located computing device may then be utilized to obtain data regarding an owner or user of the proximately located computing device. This information may be display within a graphical user interface and exposed to application programs.

9 Claims, 6 Drawing Sheets

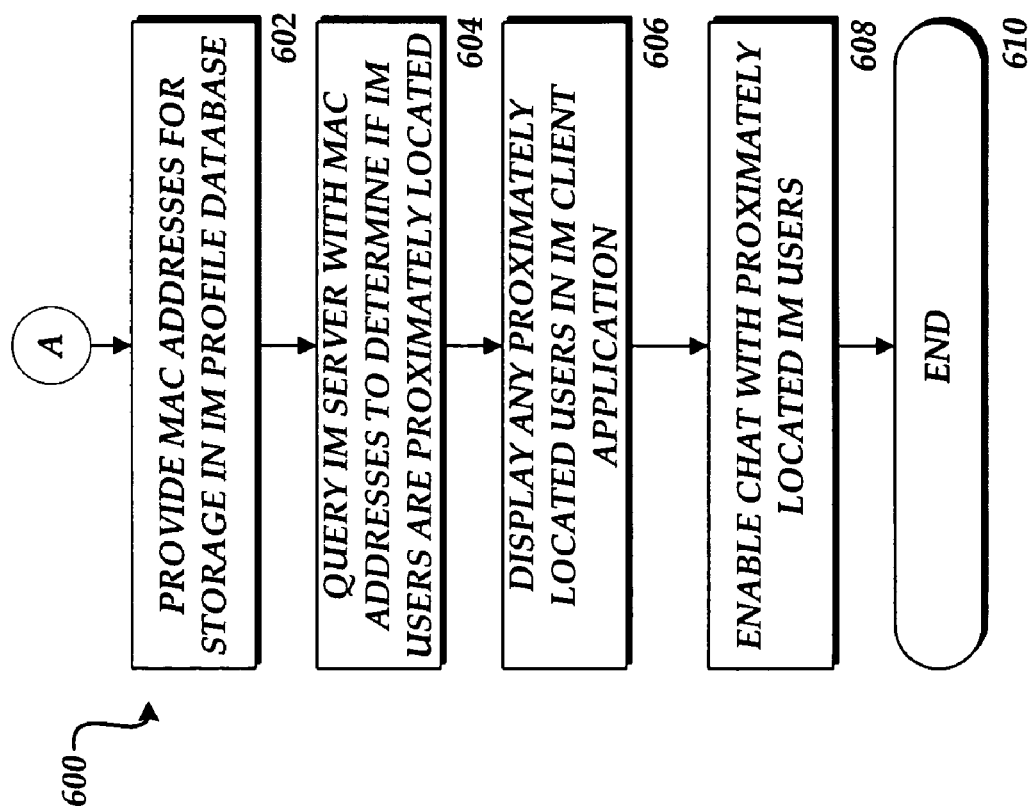
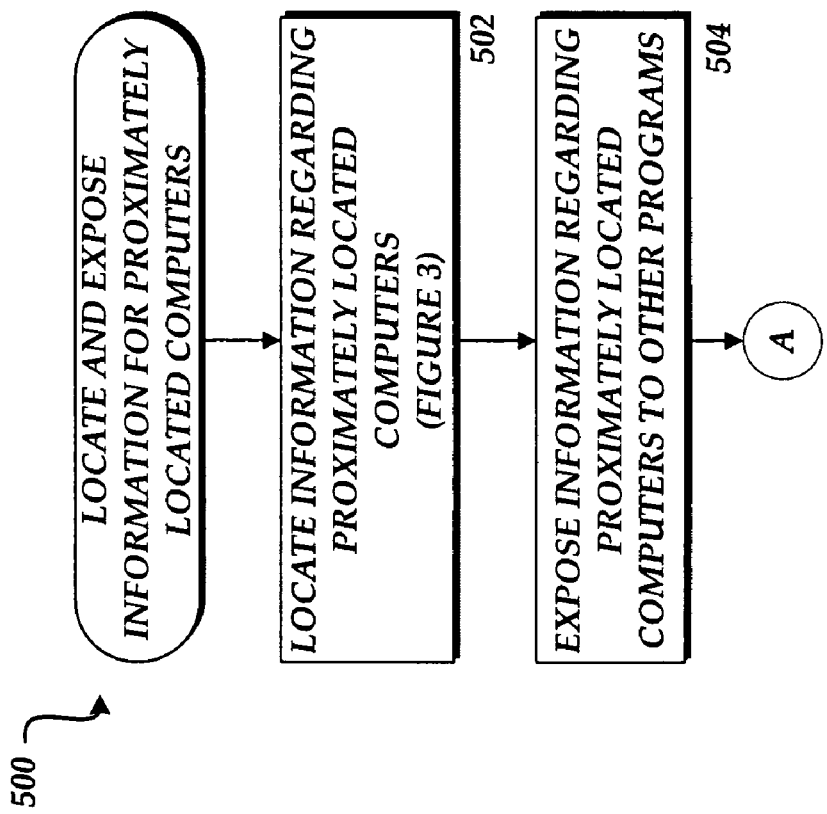

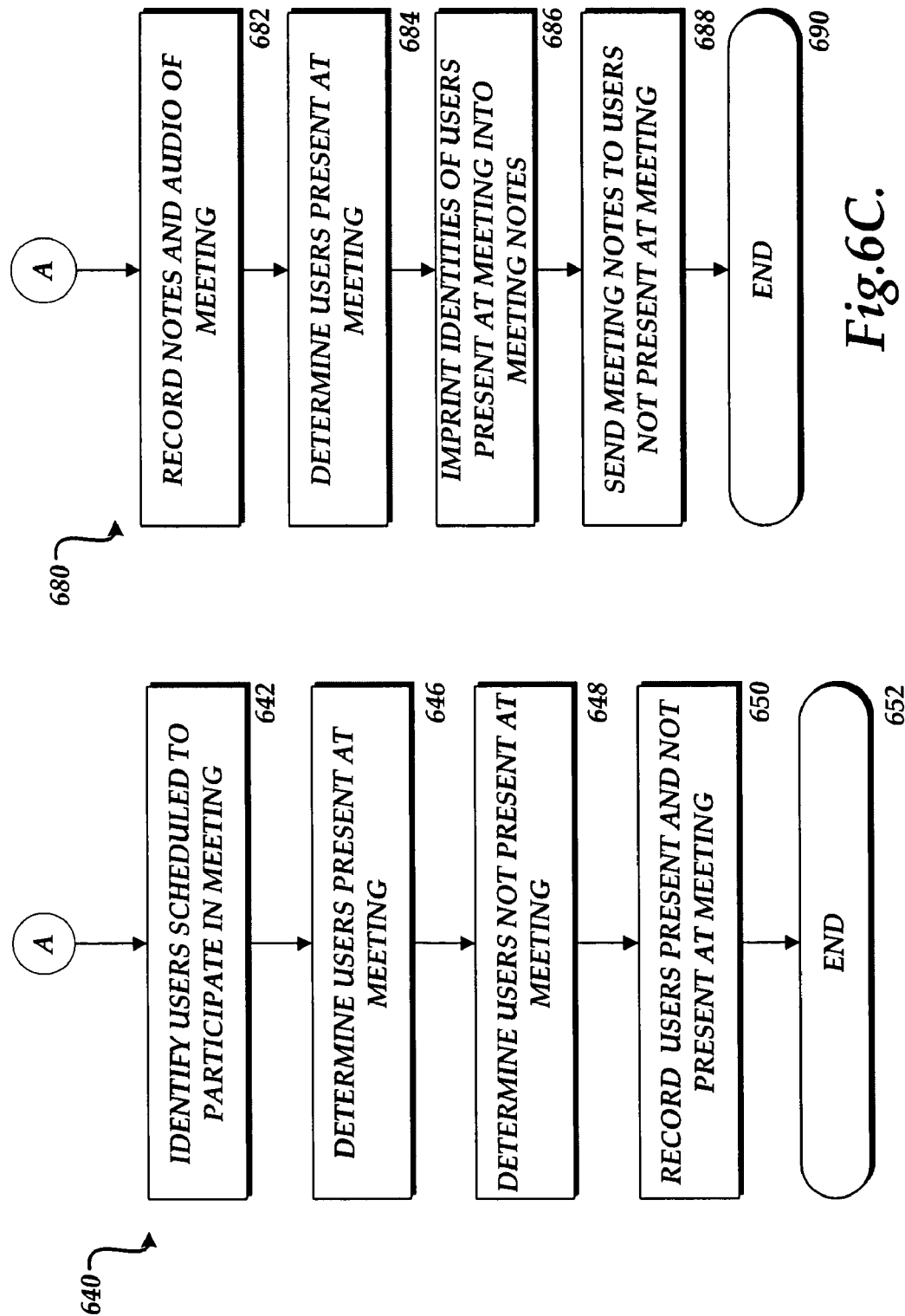

LOCATING AND DISPLAYING INFORMATION ABOUT USERS OF PROXIMATELY LOCATED WIRELESS COMPUTING DEVICES

BACKGROUND

In corporate environments, many employees spend a significant amount of time in meetings. Oftentimes, an employee may participate in a meeting that includes other employees whom they do not know. If an introduction is not made at the meeting, the employee later may be too embarrassed to introduce herself. Similarly, an employee may be in a meeting with other employees that they have met previously, but whose names they cannot remember. In this case the employee may be too embarrassed to introduce herself a second time.

Many corporate employees are issued computing devices that include wireless networking capabilities. For instance, many employees now have laptop or notebook computers that include wireless networking capabilities. Similarly, many employees may utilize cellular telephones or personal digital assistants ("PDAs") that include wireless networking capabilities. Using these devices, an employee may be able to access remotely stored information regarding other employees in a meeting. However, if the names of the other employees are unknown, it is not possible to locate information regarding the other employees. It would also not be possible to discretely contact the other employees to ask for their contact information without knowing at least their name in advance. Thus, without knowing another employee's name in advance, it would not be possible to contact the other employee with follow up questions regarding the meeting or to send meeting notes to the other employee.

Similar situations also occur in non-corporate, consumer environments. For instance, public wireless data networks have become commonplace in coffee shops, book stores, and other retail locations. When using such networks, it is currently not possible for a user to identify other users of the network in the same location, discover information about the other users, or to determine whether other users of the wireless network located nearby have common interests.

It is with respect to these considerations and others that aspects of a computing system for locating and displaying information about users of proximately located computing devices are described below.

SUMMARY

A system, apparatus, method, and computer-readable media are provided for locating and displaying information about users of proximately located wireless computing devices. A wireless communications signal is sampled to obtain one or more data packets. Data is then retrieved from the wireless data packets that uniquely identifies a proximately located wireless computing device that transmitted one or more of the data packets. A server computer is then queried with the identifying data to obtain additional information regarding the proximately located computing device.

The information regarding the proximately located computing device may then be utilized to obtain data regarding an owner or user of the proximately located computing device. For instance, a server computer may be queried with the information to obtain the name, address, phone number, e-mail address, title, office location, picture, and other information about the owner or user of the computing device. This information may be display within a graphical user interface. Signal-to-noise ratio data may also be generated from the wireless data packets. From the signal-to-noise ratio data, a relative distance to the proximately located computing device may be computed. The relative distance to the proximately located computing device may then be displayed within the graphical user interface.

The information about the user or owner of the proximately located computing device may also be exposed to application programs. For instance, the information may be exposed to an instant messaging ("IM") client application. The IM client application may then query an IM server computer with the information to determine whether the user or owner of the computing device is also a user of the IM server. If so, the IM client application may present options for communicating with the user of the proximately located computing device.

The information about the owner or user of the proximately located computing device may also be exposed to a personal information manager ("PIM") application program that includes calendar functionality. The PIM application compares the information to a list of scheduled meeting attendees to determine whether the user of the proximately located computing device is a scheduled meeting attendee. The PIM application also records whether the user of the computing device is proximately located during the scheduled time of a meeting. If a scheduled meeting attendee is not proximately located during a scheduled meeting time, a record of the meeting may be transmitted to the non-present attendee. A note-taking application program may also utilize the information to record in the meeting notes a list of the individuals that were present at the meeting.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 is a flow diagram showing an illustrative routine for locating information regarding a user of a proximately located computing device and for exposing this information to application programs; and FIGS. 6A-6C are flow diagrams showing several illustrative routines for utilizing the exposed information by the application programs.

DETAILED DESCRIPTION

Figure 1A:
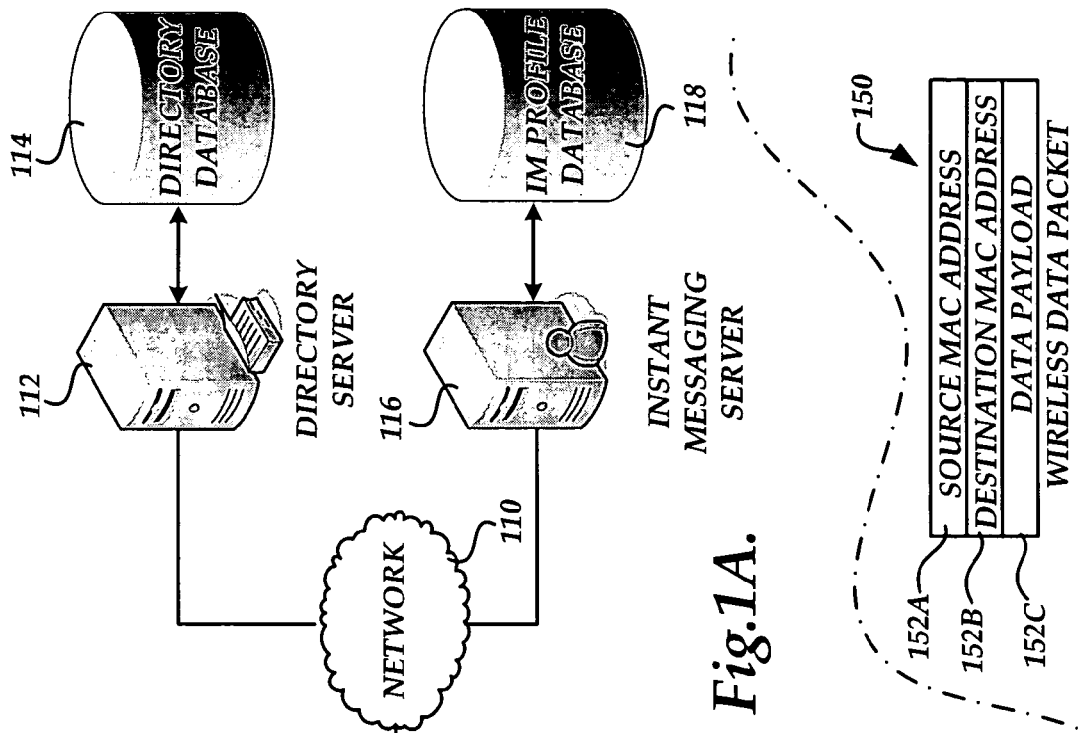
FIG. 1A is a network diagram illustrating aspects of an illustrative operating environment.

The following detailed description is directed to systems, methods, and computer-readable media for locating and displaying information about users of proximately located computing devices. While the subject matter described herein is presented in the general context of program modules that execute in conjunction with the execution of an operating system on a computer system, those skilled in the art will recognize that other implementations may be performed in combination with other program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

In the following detailed description, references are made to the accompanying drawings that form a part hereof, and which are shown by way of illustration specific embodiments or examples. Referring now to the drawings, in which like numerals represent like elements through the several figures, aspects of a computer system for locating and utilizing information regarding a user of a proximately located wireless computing device will be described. In particular, FIG. 1A shows aspects of an illustrative operative environment for the subject matter described herein.

The illustrative operating environment shown in FIG. 1A includes a wireless network 106. The wireless network 106 is made up of one or more computing devices 100A-100F and a wireless network router 108. The computing devices 100A-100F may comprise any type of wireless networking-enabled computing device including, but not limited to, laptop computers, desktop computers, PDAs, cellular telephones, hand-held or console gaming systems, set-top boxes, and any other type of computing device with integrated or add-on wireless networking hardware. As shown in FIG. 1A, each of the computing devices is operated by a user 102A-102F, respectively. Each of the users 102A-102F may also be the owner of their respective computing device 102A-102F.

The wireless network router 108 is connected to the wired network 110. The wired network 110 may comprise a widearea network, such as the Internet, a local area network, or other type of network known to those skilled in the art. The wireless network router 108 enables communication between the computing devices 100A-100F and the wired network 110. In particular, each of the computing devices 100A-100F communicates with the wireless network router 108 via wireless communications signals 104A-104F, respectively. The wireless router 108 relays requests and responses between the computing devices 100A-100F and the various resources available on the wired network 110, such as the directory server 112 and the IM server 116. The wireless communications signals 104A-104F generated by the wireless network router 108 and the computing devices 100A-100F make up the communications medium for the wireless network 106.

It should be appreciated that the wireless network 106 may operate utilizing virtually any wireless networking standard, including both short range and long range wireless networking standards. For instance, according to embodiments, the wireless network 106 comprises a wireless network compatible with the IEEE 802.11b or 802.11g wireless networking standards, collectively known as "WIFI". Alternatively, the wireless network 106 may comprise a long range wireless network compatible with the IEEE 802.16 standard, known as "WIMAX." It should be appreciated, however, that virtually any type of wireless network may utilize the aspects of the computing systems described herein. It should also be appreciated that while the aspects of the computing systems described herein are presented in the context of an infrastructure network, the computing systems described herein are equally applicable to ad-hoc and mesh wireless networks that do not utilize a centralized wireless access point such as the wireless network router 108.

The wired network 110 includes a network connection to a directory server 112. The directory server 112 is a central repository for storing information regarding computing devices and users of the computing devices. For instance, the directory server 112 may maintain a directory database 114 that includes data regarding the computing devices 100A-100F and the users 102A-102F of the computing devices. According to one implementation, the directory server 112 comprises a server computer executing the ACTIVE DIRECTORY directory service from MICROSOFT CORPORATION of Redmond, Wash. It should be appreciated, however, that other types of directory applications from other manufacturers may also be utilized.

With regard to the computing devices 100A-100F, the directory database 114 may contain data identifying the type of computing device and its specifications, data identifying a unique hardware identifier for the computing device, data that uniquely identifies the wired and wireless network adapters within the computing device, one or more networking addresses of the computing device, and the identity of the owner of the computing device. According to embodiments, the data that uniquely identifies the wired and wireless network adapters within a computing device is the media access control ("MAC") address of the device. As known to those skilled in the art, wired and wireless network adapters are assigned a globally unique MAC address at the time of manufacture. As will be described in greater detail below, in one embodiment the MAC address of a computing device 100A-100F is utilized to uniquely identify the computing device when it is operating within the wireless network 106. It should be appreciated that other information may also be stored in the directory database 114 and utilized in the manner described herein.

With regard to the users 102A-102F, the directory database 114 may contain data regarding each user 102A-102F, such as the user's name, title, office location, photograph, department, employment status, and other information. It should be appreciated that the computing devices 100A-100F may be utilized to query the directory server 112 for data contained in the directory database 114. In this regard, the directory server 112 is operative to receive and respond to queries for information contained in the directory database 114 from the computing devices 100A-100F. As will be described in greater detail below, data that uniquely identifies one of the computing devices 100A-100F may be utilized in a query to the directory server 112 to retrieve data about the user 102A-102F of the identified computing device.

As shown in FIG. 1A, the wired network 110 is also connected to an IM server 116. The IM server 116 is a server operative to enable instant messaging communications between IM client applications executing on two or more of the computing devices 100A-100F. The IM server 116 may also enable other types of interaction between the IM client applications, such as voice or video chat. To enable these features, the IM server 116 maintains an IM database 118. The IM database 118 is utilized to store user profiles for each registered user of the IM server 116. A user profile may include data such as the user's identity, electronic mail address, contact preferences, interests, and other information. According to embodiments, each user profile also includes information that uniquely identifies the user's computing device 100A-100F, such as the MAC address of a wireless network adapter in the user's computing device. As will be described in greater detail below, this information is utilized to identify computing devices that are communicating on the same wireless network 106 and therefore proximately located to one another.

In order to enable the features described herein, the wireless network interface of one or more of the computing devices 100A-100F is placed in a promiscuous mode of operation. The promiscuous mode of operation is a special reception mode that allows a wireless network interface to receive all data packets that are transmitted on the wireless network 106 rather than just packets intended for itself. In this manner, each of the computing devices 100A-100F may be configured to receive packets transmitted from another of the computing devices 100A-100F to the wireless network router 108. For instance, if the wireless interface of the computing device 100A is placed into promiscuous mode, the computing device 100A will receive wireless packets transmitted by the computing devices 100B-100F to the wireless network router 108. It should be appreciated that the implementations described herein may operate without utilizing the promiscuous mode of operation. However, without using the promiscuous mode, not all of the wireless packets transmitted by the other computing devices on the wireless network 106 may be received.

Figure 1B:
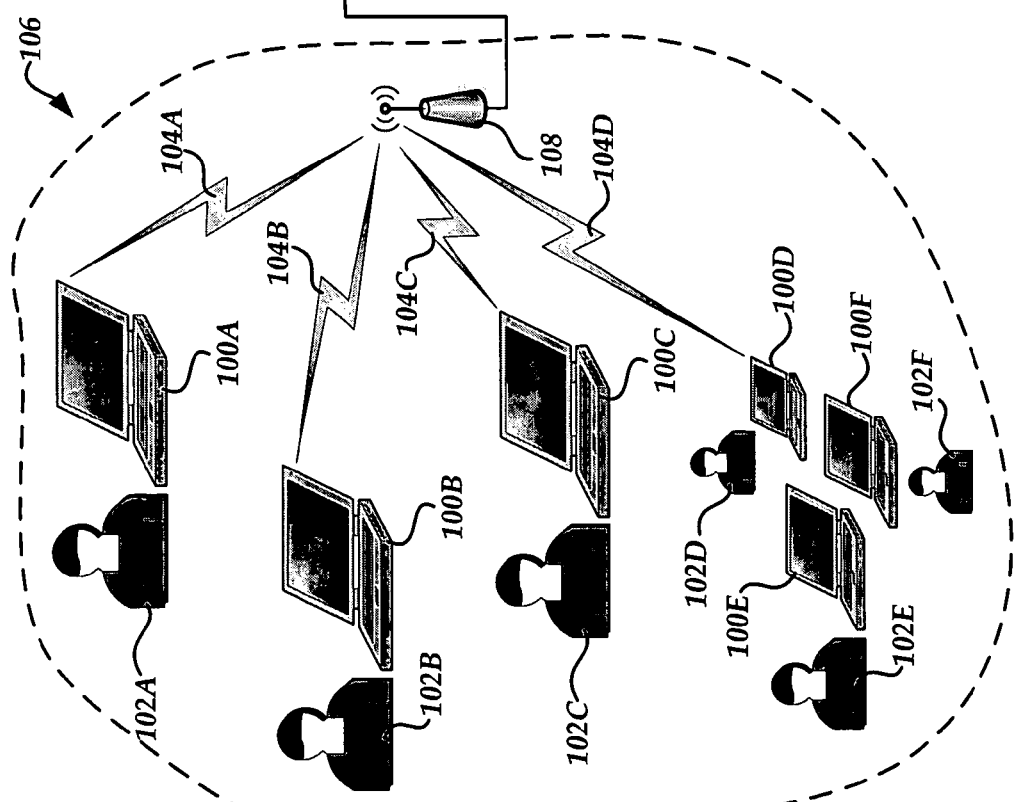
FIG. 1B is a data structure diagram illustrating the contents of a wireless data packet utilized in one implementation.

FIG. 1B illustrates a portion of the contents of a typical wireless data packet 150. As discussed above, data packets such as the wireless data packet 150 may be received by the computing devices 100A-100B. When operating in promiscuous mode, the data packets received may include packets intended for the computing device or for other computing devices. In order to identify the actual source and destination computing devices for a packet, the wireless data packet 150 includes data that uniquely identifies the computing device that is the source of the packet and the computing device that is the destination for the packet. This information is sent in the clear over the wireless communications signal 104A-104F without any encryption. According to an implementation, this information may comprise the MAC address 152A of the source computing device and the MAC address 152B of the destination computing device. It should be appreciated, therefore, that by receiving wireless data packets in promiscuous mode, the computing devices 100A-100F are able to receive information (the MAC addresses in an implementation) that uniquely identifies the other computing devices operating proximately within the wireless network 106.

As shown in FIG. 1B, the wireless data packet 150 includes a data payload 152C. The data payload 152C includes the actual data for the packet. The data payload 152C may or may not be encrypted. However, because the data that uniquely identifies the source and destination of the wireless data packet 150 is sent in the clear, it is not necessary to utilize the contents of the data payload 152C. Accordingly, the use of wireless security protocols in the wireless network 106 does not impact the ability of the computing systems described herein to perform their described functions.

As will be described in greater detail below with reference to FIGS. 2-6C, the wireless communications signal 104A-104F may be sampled in promiscuous mode by one of the computing devices 100A-100F to obtain wireless data packets 150 transmitted by or intended for other computing devices. Data may then be retrieved from the wireless data packets that uniquely identifies the proximately located wireless computing device that transmitted one or more of the data packets, such as the computer's MAC address. A server computer, such as the directory server 112 or the IM server 116, is then queried with the identifying data to obtain additional information regarding the proximately located computing device. The information regarding the proximately located computing device may then be utilized to obtain data regarding a user 102A-102F of the proximately located computing device. This information may then be exposed to application programs for use in a variety of ways described below.

Figure 2:
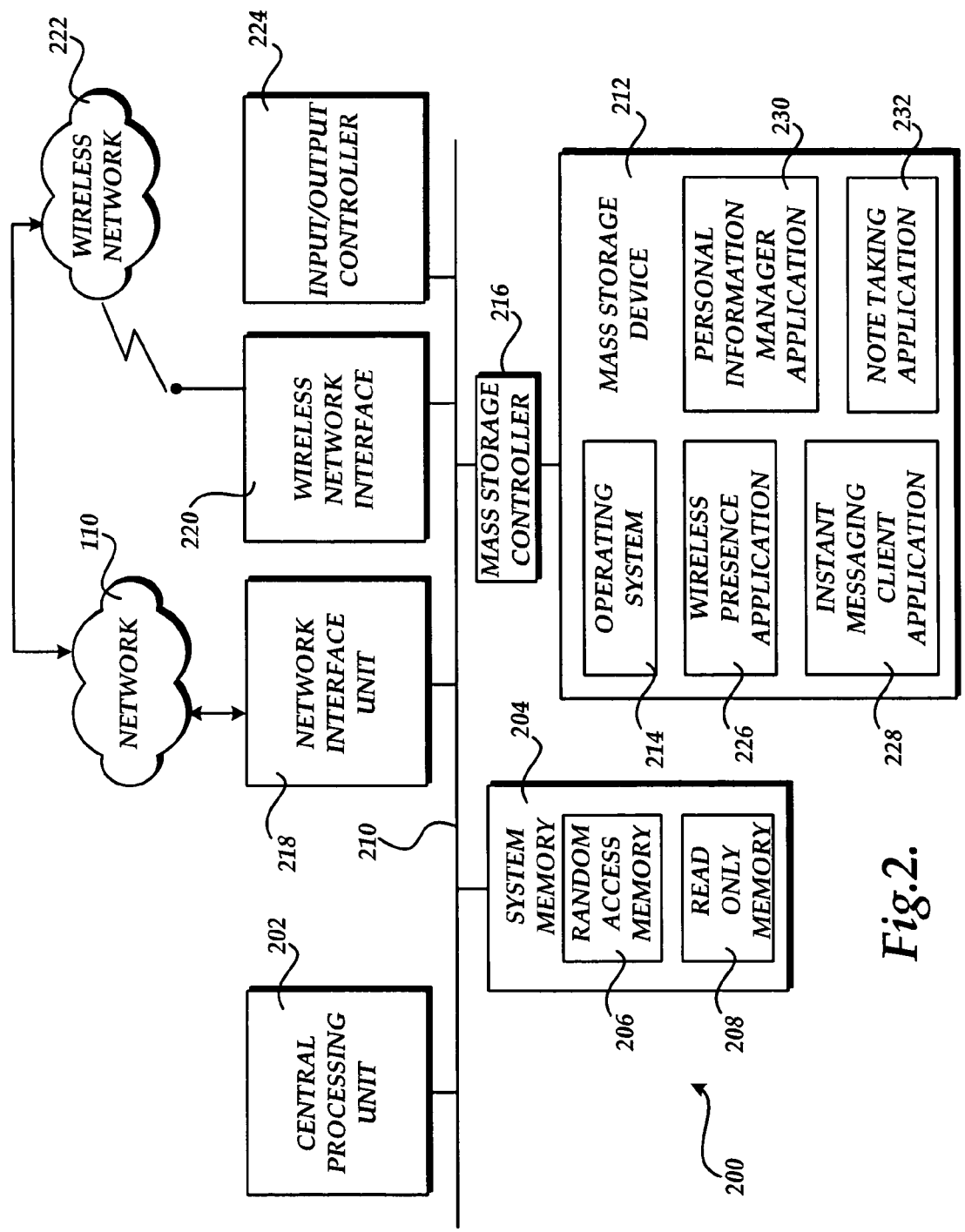
FIG. 2 is a computer architecture diagram suitable for implementing a computer system such as discussed with reference to FIGS. 1 and 3-6C.

Referring now to FIG. 2, a brief, general description of a suitable computing environment in which the subject matter described herein may be implemented will be provided. In particular, FIG. 2 shows an illustrative computer architecture for a computing device 200. This computer architecture may be utilized to embody the computer systems illustrated in and discussed above with reference to FIG. 1A. For instance, the computer architecture shown in FIG. 2 may be utilized to implement the computing devices 100A-100F, the directory server 112, the instant messaging server 116, and any other computer systems discussed herein. It should be appreciated that although the computer architecture shown in FIG. 2 embodies a standard laptop, desktop computer, or server computer, other types of computer architectures and computing devices may be utilized. In particular, the subject matter described herein may be utilized with a conventional desktop or "personal" computer, a laptop computer, a handheld or portable computing device, a server computer, a wireless handset, such as a cellular or PCS telephone, a personal digital assistant, a custom hardware device, and virtually any other type of computing device.

The computer architecture shown in FIG. 2 includes a central processing unit 202 ("CPU"), a system memory 204, including a random access memory 206 ("RAM") and a read-only memory ("ROM") 208, and a system bus 210 that couples the memory to the CPU 202. A basic input/output system containing the basic routines that help to transfer information between elements within the computer, such as during startup, is stored in the ROM 208. The computing device 200 further includes a mass storage device 212 for storing an operating system 214, application programs, and other program modules, which will be described in greater detail below.

The mass storage device 212 is connected to the CPU 202 through a mass storage controller 216 connected to the bus 210. The mass storage device 212 and its associated computer-readable media provide non-volatile storage for the computing device 200. Although the description of computer-readable media contained herein refers to a mass storage device, such as a hard disk or CD-ROM drive, it should be appreciated by those skilled in the art that computer-readable media can be any available media that can be accessed by the computing device 200.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 200.

According to various embodiments of the subject matter described herein, the computing device 200 may operate in a networked environment using logical connections to remote computers through a network 110, such as the Internet. The computing device 200 may connect to the network 110 through a network interface unit 218 connected to the bus 210. It should be appreciated that the network interface unit 218 may also be utilized to connect to other types of networks and remote computer systems. The computing device 200 may also include a wireless network interface 220 for connecting to a wireless network 222. As shown in FIG. 2, the wireless network 222 may provide a gateway for connecting to the network 110. The wireless network interface 220 may be embodied as an add-on card for the computing device 200, such as a PCMCIA adapter card, or may be physically integrated with the other components making up the computing device 200.

The wireless network interface 220 may also be compatible with various wireless networking standards. For instance, according to embodiments, the wireless network interface 220 comprises a card compatible with the IEEE 802.11b and IEEE 802.11g networking standards. The wireless network interface 220 may also be compatible with current or future long range wireless networking standards, such as WIMAX. It should be appreciated that the embodiments described herein may be utilized with virtually any wireless networking standard or protocol.

The computing device 200 may also include an input/output controller 224 for receiving and processing input from a number of other devices, including a keyboard, mouse, or electronic stylus (not shown in FIG. 2). Similarly, an input/output controller 224 may provide output to a display screen, a printer, or other type of output device (also not shown in FIG. 2).

As mentioned briefly above, a number of program modules and data files may be stored in the mass storage device 212 and RAM 206 of the computing device 200, including an operating system 214 suitable for controlling the operation of a networked personal computer, such as the WINDOWS XP operating system from MICROSOFT CORPORATION of Redmond, Wash. Other operating systems may also be utilized, such as the LINUX operating system, the OSX operating system from APPLE COMPUTER, INC, and others. The mass storage device 212 and RAM 206 may also store one or more program modules. In particular, the mass storage device 212 and the RAM 206 may store a wireless presence application program 226, an IM client application 228, a personal information manager ("PIM") application program 230, and a note taking application program 232.

The wireless presence application 226 is an application program that is operative to perform the functions described herein for placing a wireless network interface into a promiscuous mode, for sampling the wireless communications signal 104A-104F to obtain wireless data packets, for extracting the data from the packets that uniquely identifies the sender or receiver of the packet, and for querying the directory server 112 for information regarding the proximately located computing device 100A-100F that sent or received the packet or its user 102A-102F. According to an implementation, the wireless presence application 226 is further operative to receive signal strength data for the wireless data packets from the wireless network interface 220. This signal strength data may then be utilized to calculate the relative distances from the computing device receiving the packets to each of the other proximately located computing devices 100A-100F. Other types of wireless network interfaces may also provide distance and direction data that may be utilized by the wireless presence application 226.

According to other implementations, the wireless presence application 226 is further operative to provide a user interface for displaying information regarding the proximately located computing devices 100A-100F and the users 102A-102F. This user interface is described in greater detail below with respect to FIG. 4. According to yet other implementations, the wireless presence application 226 is operative to expose the information regarding the proximately located computing devices 100A-100F and the users 102A-102F to other application programs. Details regarding these other application programs and their use of the exposed data is provided below with respect to FIGS. 6A-6C. It should be appreciated that although the functionality described herein is presented as being performed by the wireless presence application 226, it should be appreciated that this functionality may be embodied in other types of applications programs or the operating system 214. In this regard, the operating system 214 may provide and expose interfaces that allow calling programs to obtain and utilize the collected data regarding the proximately located computing devices and users.

It should be appreciated that the wireless presence application 228 may provide additional functionality other than that described above. For instance, according to an implementation, the wireless presence application 228 may be configured to provide a notification when a computing device passes within close proximity. This may be useful, for instance, for determining when a desired user comes within wireless range. Other functionality may also be incorporated into the wireless presence application.

The IM client application 228 comprises an application program operative to communicate with the IM server computer 116 and, potentially, directly with other IM client applications. The IM client application 228 provides functionality and a user interface that allows users of the IM server computer 116 to communicate with one another through text, audio, or video messaging.

According to an implementation, the IM client application 228 is also operative to identify other users of the IM server computer 116 that are proximately located and to provide information and enable communications with these users. The IM client application 228 may comprise the MSN MESSENGER instant messaging client application program from MICROSOFT CORPORATION or another IM client application from another manufacturer. Additional details regarding the operation of the IM client application 228 provided herein will be discussed below with reference to FIG. 6A.

The PIM application 230 comprises an application program for managing personal information, such as electronic mail messages, a calendar, contacts, tasks, notes, or other information. As will be described in greater detail below with respect to FIG. 6B, the PIM application 230 provided herein is operative to utilize the information regarding the proximately located computing devices to determine whether users are present at a meeting. This data may be recorded in a calendar appointment by the PIM application 230. The PIM application 230 may comprise the OUTLOOK personal information manager application program from MICROSOFT CORPORATION or another PIM application from another manufacturer.

The note taking application 232 comprises an application program for allowing a user to take handwritten or typed notes. Audio or video may also be recorded and synchronized with the notes. As will be described in greater detail below with respect to FIG. 6C, the note taking application 232 provided herein is operative to stamp the identities of users present at a meeting into the notes for the meeting. Additionally, when operating in conjunction with the PIM application 230, the note taking application program 232 may be operative to transmit the notes for a meeting to users that were scheduled to attend the meeting but whose computing devices were not proximately located during the scheduled meeting time. The note taking application 232 may comprise the ONENOTE note taking application program from MICROSOFT CORPORATION or another note taking application program from another manufacturer.

Figure 3:
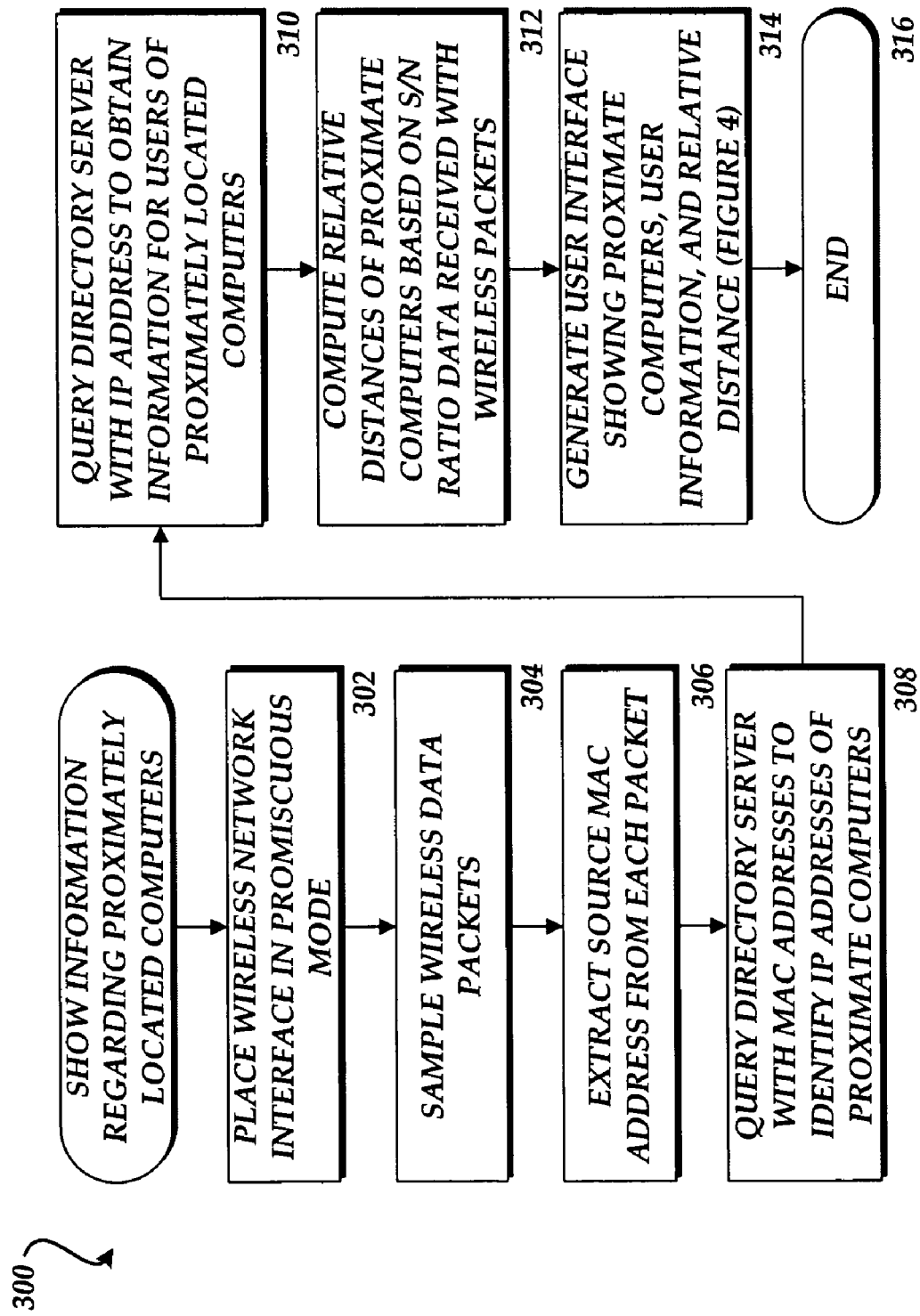
FIG. 3 is a flow diagram showing an illustrative routine for locating and displaying information about a user of a proximately located computing device.

Turning now to FIG. 3, an illustrative routine 300 will be described showing the operation of the computer system 100 for obtaining and displaying information regarding a user of a proximately located computing device. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein with respect to are referred to variously as operations, structural devices, acts, or modules. These operations, structural devices, acts and modules may be implemented in software, in firmware, in special purpose digital logic, and any combination.

The routine 300 begins at processing operation 302, where the wireless presence application 226 places the wireless network interface 220 into promiscuous mode. As described above, this allows the wireless network interface 220 to receive wireless data packets intended for other wireless network interfaces. Once the wireless network interface 220 has been placed into promiscuous mode, the routine 300 continues to operation 304, where the wireless network interface 220 samples the wireless data packets being transmitted on the wireless network 106. Sampling may take place for a predetermined period of time and be performed at predetermined times or triggered manually as described below. Continuous sampling of the wireless data packets may also be performed.

Once a sampling of wireless data packets has been obtained, the routine 300 continues to operation 306, where the data that uniquely identifies the source of the data packet is obtained. In particular, according to one implementation, the source MAC address 152A is extracted from the sampled packets to identify each of the proximately located computers that transmitted a packet during the sampling period. The destination MAC address 152B may also be used similarly. Once the MAC addresses of the proximately located computing devices have been obtained, the routine 300 continues to operation 308.

At operation 308, a query is transmitted to the directory server 112 with a MAC address of a proximately located computing device. The query is structured to request the network address, such as an internet protocol ("IP") address, of the computing device having the specified MAC address. In response, the directory server 112 searches the directory database 114 for a record that includes the specified MAC address. If such a record is found, the record is searched for the current IP address for the computing device. If located, the IP address is returned in response to the query. The routine 300 then continues to operation 310.

At operation 310, a second query is transmitted to the directory server 112. This query includes the received IP address and requests information for the user that has been assigned the specified IP address. For instance, the query may request the name, picture, title, office location, or other information for a user having the specified IP address. In response to the query, the directory server 112 queries the directory database 114 to locate a user record that includes the specified IP address. If such a record is located, the record is searched for the requested information. The requested information is then returned as a response to the query. The routine 300 then continues to operation 312.

At operation 312, the wireless presence application 226 computes the relative distances to the proximately located computing devices. As described above, this calculation is performed utilizing the signal strength data received from the wireless network interface 220. From operation 312, the routine 300 continues to operation 314.

Figure 4:
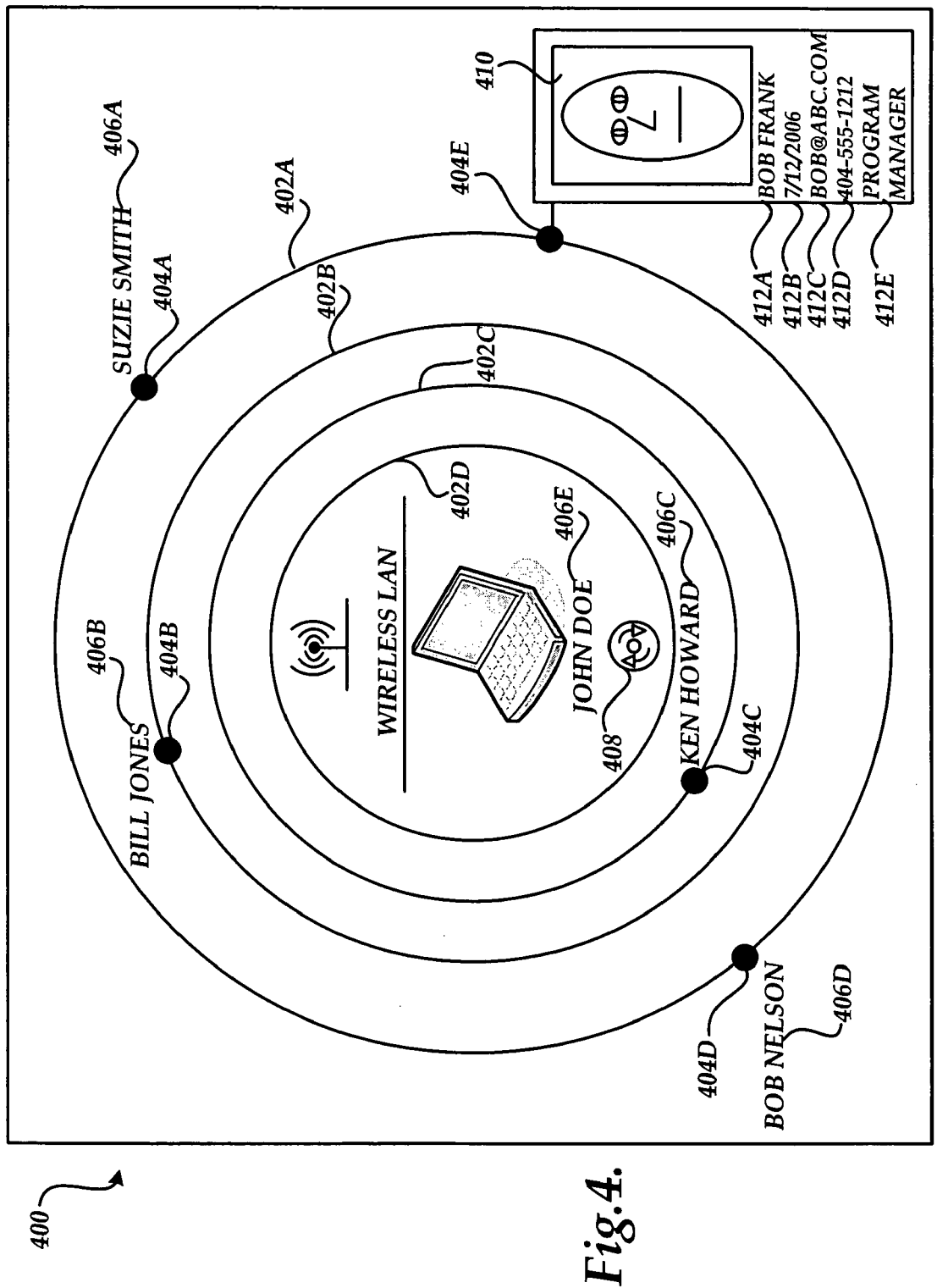
FIG. 4 is an illustrative user interface for displaying information regarding a user of a proximately located computing device.

At operation 314, the wireless presence application 226 generates a user interface for presenting the obtained data regarding the proximately located computing devices and users. This may also include presenting data regarding the relative distances and directions to the computing devices. FIG. 4 shows an illustrative user interface for providing this information in one implementation. Accordingly, additional details regarding this user interface will be provided below with respect to FIG. 4. From operation 314, the routine 300 continues to operation 316, where it ends.

FIG. 4 shows an illustrative user interface 400 for displaying information regarding a user of a proximately located computing device. In particular, the user interface 400 includes several concentric circles 402A-402D. At the center of the circles 402A-402D is an image representing the computing device that is executing the wireless presence application 226. The name 406E of the current user of the computing device executing the wireless presence application 226 is also displayed. A refresh button 408 is also displayed in the center. When the refresh button 408 is selected, the process discussed above with respect to FIG. 3 is repeated and, upon completion, the user interface 400 is updated.

Indicators 404A-404E are also displayed at various locations on the circles 402A-402D. Each of the indicators 404A-404E represents the location of a detected proximately located computing device 100A-100F. The indicators 404A-404E are displayed in a location corresponding to the computed relative distance from the computing device executing the wireless presence application 226. If direction information is available, the indicators 404A-404E are displayed in a manner that shows the actual direction to the computing device. The name 406A-406E of the user of the computing device is displayed next to each indicator 404A-404E, respectively.

In order to display additional information regarding a user of one of the computing devices, one of the indicators 404A-404E may be selected using an input device. In response to such a selection, additional information regarding the user may be displayed. For instance, as shown in FIG. 4, a picture 410, name 412A, hire date 412B, e-mail address 412D, and title 412E have been displayed in response to the selection of the indicator 404E. According to an implementation, a user interface may be provided for adjusting the sensitivity of the user interface 400 to display fewer or more users. Other information may also be displayed similarly.

Referring now to FIG. 5, an illustrative routine 500 will be described for locating information regarding proximately located computing devices and users, and for exposing this information to other application programs. The routine 500 begins at operation 502, where information regarding proximately located computing devices and users is obtained. According to an implementation, this information is obtained in the manner described above with respect to FIG. 3.

Once the information regarding the proximately located computing devices and users has been obtained, the routine 500 continues to operation 504, where this information is exposed to other application programs. In order to expose the data, an application programming interface ("API") may be provided that exposes a public interface for obtaining the data. Once the interface has been exposed, other applications may retrieve the data and utilize it in a variety of ways. In particular, FIGS. 6A-6C are flow diagrams that show illustrative uses of the data by an IM client application 228, a PIM application 230, and a note taking application 232, respectively. Additional details regarding this functionality is provided below with respect to FIGS. 6A-6C.

Turning now to FIG. 6A, a routine 600 will be described illustrating the operations of the IM client application 228 with regard to the use of information about proximately located computing devices and users. In particular, the routine 600 begins at operation 602, where a user of the IM client application 228 authorizes the submission of and storage of the MAC address of the wireless network interface 220 in the IM profile database 118. Because this information is not typically stored in an IM profile database 118 and utilized in the manner described herein, the user may be prompted and given the opportunity to decline the submission of their MAC address to the IM server computer 116 and the ability to be located wirelessly.

From operation 602, the routine 600 continues to operation 604, where the IM server computer 116 is queried with the MAC addresses of the proximately located computing devices. In response to such a query, the IM server computer 116 is operative to search the IM profile database 118 to locate user profiles having the identified MAC addresses. If profiles are found, the IM server computer 116 returns the identity of the located users to the IM client application 116. In this manner, other users of the IM server computer 116 that are proximately located are identified and their identities submitted to the IM client application 228. This information is then displayed to the user at operation 606.

From operation 606, the routine 600 continues to operation 608, where chat functionality is enabled with the users of the proximately located computers. In particular, a list of the proximately located users may be displayed. If a user is selected, they will be provided the opportunity to chat with the proximately located user via text, audio, or video. It should be appreciated that the functionality described herein is different than a traditional "buddy list" provided by IM client applications in that the proximately located users are typically not known in advance. From operation 608, the routine 600 continues to operation 610, where it ends.

Referring now to FIG. 6B, a routine 640 will be described illustrating the operations of the PIM application 230 with regard to the use of information about proximately located computing devices and users. In particular, the routine 640 begins at operation 642, where the PIM application program 230 identifies the users scheduled to participate in a meeting. As described above, the PIM application program 230 includes calendaring functionality, including the ability to schedule meetings and identify the users that are scheduled to attend the meeting.

Once the users scheduled to attend a meeting have been identified, the routine 640 continues to operation 646 where the PIM application 230 determines the users that are present at the meeting. This is accomplished by performing the process described above with respect to FIG. 3 to generate a list of proximately located users. The users not currently present at the meeting are identified at operation 648 by comparing the present users to a list of scheduled attendees. It should be appreciated that, in order to be considered "present" at a meeting, a user must have their wireless computing device turned on and the wireless network interface active.

From operation 648, the routine 640 continues to operation 650, where the users present and not present at the meeting are recorded in a calendar event for the meeting. As will be described in greater detail below with respect to FIG. 6C, this information may also be utilized to transmit notes from the meeting to those users not in attendance. From operation 650, the routine 640 continues to operation 652, where it ends.

Turning now to FIG. 6C, a routine 680 will be described illustrating the operations of the note taking application 232 with regard to the use of information about proximately located computing devices and users. In particular, the routine 680 begins at operation 682, where the note taking application 682 is utilized to record notes of the meeting. As discussed above, the notes may comprise handwritten notes utilizing a touch screen or other pointing device, typed notes, audio notes, or video notes.

From operation 682, the routine 600 continues to operation 684, where the users present at the meeting are determined in the manner described above. Once the identities of the users present at the meeting have been identified, the routine 680 continues to operation 686, where the identities of the users present at the meeting are stored in the meeting notes. In a similar manner, this information may be updated as users join or exit the meeting to indicate the time at which users joined or left. When the meeting has completed, the routine 600 continues to operation 688, where the meeting notes are transmitted, using the PIM application 230, to any users that were not present at the meeting. From operation 688, the routine 680 continues to operation 690, where it ends.

Based on the foregoing, it should be appreciated that systems, methods, and computer-readable media for locating and displaying information about users of proximately located computing devices. It should also be appreciated that the functionality described herein is performed without requiring any new application program code to be installed on the computers 100A-100F that are detected and identified as being proximately located as described above.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims. The various subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for locating and displaying information about a user of a proximately located computing device, the method comprising:

sampling a wireless communications signal to obtain one or more wireless data packets;

retrieving a media access control (MAC) address from the wireless data packets that uniquely identifies a proximately located computing device that transmitted one or more of the wireless data packets;

querying a server computer with the MAC address to obtain an internet protocol (IP) address assigned to the proximately located computing device;

querying a server computer with the IP address assigned to the proximately located computing device to obtain information regarding a user of the proximately located computing device;

receiving signal-to-noise ratio data for the one or more wireless data packets transmitted by the proximately located computing device; and computing a relative distance to the proximately located computing device based on the signal-to-noise ratio data.

2. The method of claim 1, further comprising displaying a user interface that includes the information regarding a user of the proximately located computing device and the relative distance to the proximately located computing device.

3. The method of claim 1, further comprising exposing the information regarding a user of the proximately located computing device to an application program.

4. The method of claim 3, wherein the application program comprises an instant messaging client application program, and wherein the instant messaging client application program is operative to query an instant messaging server computer with the MAC address to determine whether another user of the instant messaging client application is located proximately.

5. The method of claim 3, wherein the application program comprises a calendaring program, and wherein the calendaring program is operative to compare the information regarding a user of the proximately located computing device to data contained in a list of scheduled meeting attendees to determine whether the scheduled meeting attendees are proximately located during a scheduled time of a meeting.

6. The method of claim 5, further comprising sending a record of the meeting to any of the scheduled meeting attendees that are not proximately located during the scheduled time of the meeting.

7. A computer-readable medium having computer-executable instructions stored thereon which, when executed by a computer, cause the computer to:

place a wireless network interface into a promiscuous mode of operation;

sample a wireless communications signal by way of the wireless network interface to retrieve one or more wireless data packets transmitted by a proximately located computing device;

extract identifying data from the one or more wireless data packets that uniquely identifies the proximately located computing device;

transmit the identifying data to a server computer with a query for information regarding a user of the proximately located computing device;

receive the information regarding the user of the proximately located computing device from the server computer in response to the query;

display a user interface that includes the information regarding the user of the proximately located computing device;

receive signal-to-noise ratio data from the wireless network interface for the one or more wireless data packets transmitted by the proximately located computing device;

compute a relative distance to the proximately located computing device based on the signal-to-noise ratio data; and to display data indicating the relative distance as a part of the user interface.

8. The computer-readable medium of claim 7, having further computer-executable instructions stored thereon which, when executed by a computer, cause the computer to expose the information regarding the user of the proximately located computing device to an application program.

9. The computer-readable medium of claim 7, wherein the identifying data comprises a media access control (MAC) address.

* * * * *